June 7, 1960
C. B. HAEGERT
2,940,060
BATTERY TERMINAL CLAMP
Filed May 14, 1958
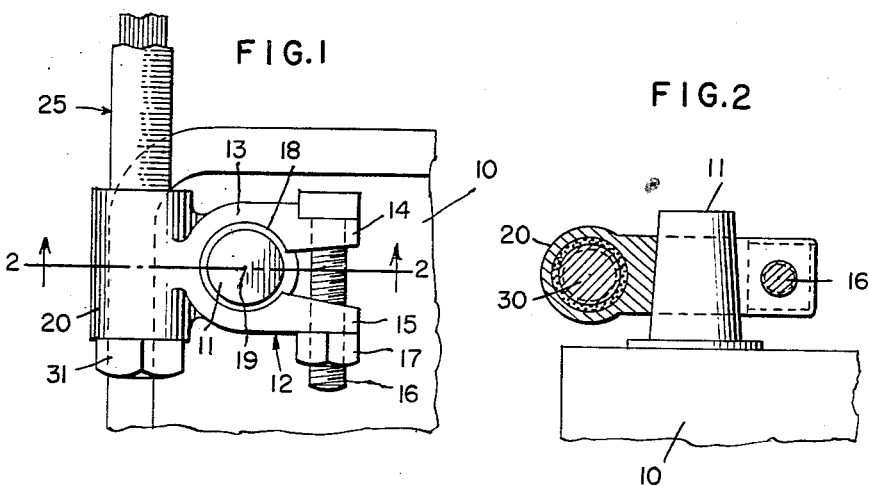
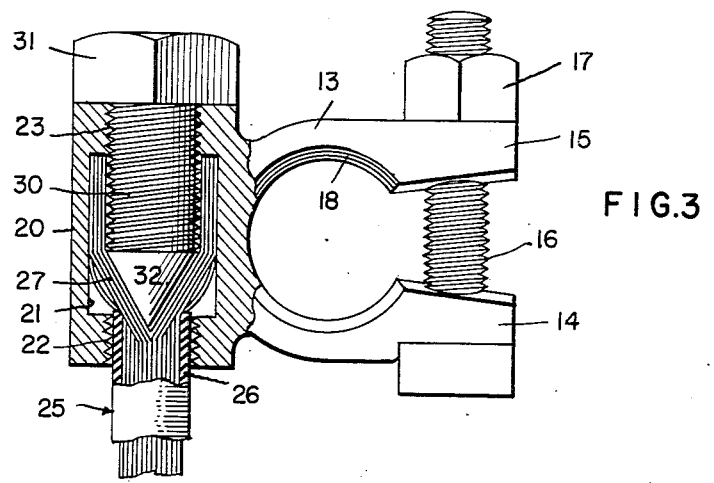
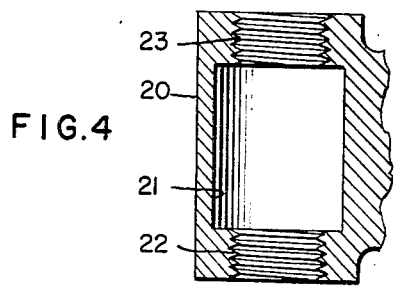
INVENTOR.
Clarence B. Haegert
BY
Shoemaker & Mattare
ATTYS

United States Patent Office 2,940,060
Patented June 7, 1960

2,940,060
BATTERY TERMINAL CLAMP

Clarence B. Haegert, P.O. Box 318, Coffeyville, Kans.

Filed May 14, 1958, Ser. No. 735,274

2 Claims. (Cl. 339—100)

The present invention relates to a new and novel battery terminal clamp, and more particularly to a battery terminal clamp which may be attached to varying sizes of terminals and which permits attaching a cable thereto from a variety of directions.

The invention battery terminal clamp is adapted to be used as a permanent connection wherein solder may be employed to additionally strengthen the connection, and the novel clamp is especially adapted for use in emergency situations when it is desired to connect a cable end to a battery clamp where facilities are not available for attaching the cable ends by soldering or the like.

A number of devices have been developed in the prior art to permit emergency connection of cable ends to a battery terminal, but such known devices having proved unsatisfactory for a variety of reasons. When cable ends are connected to known type emergency clamps, the wires of the bared end of the cable are often exposed whereby moisture is allowed to impinge upon the bared end of the cable and produces acidation at the point of connection of the cable end to the terminal clamp. This is obviously undesirable since such acidation will cause inefficient contact between the cable and the clamp and further will tend to corrode the end of the cable. In addition, prior art clamps do not provide a sufficiently universal connection whereby the cable may be connected to the clamp from opposite portions thereof, without providing extra lengths of cable and bending the cable into proper position.

The present invention provides an arrangement wherein emergency connections may be made quickly and easily between the clamp and a cable end and which does not require the use of solder or specialized tools. The clamp is provided with a means for receiving the insulated portion of the cable and forming a waterproof seal between the clamp and the insulation of the cable, thereby substantially eliminating the possibility of moisture engaging the bared ends of the cable. The novel structure of the present invention also provides a very versatile arrangement whereby a cable end may be attached to the clamp from opposite directions as may be most convenient in any particular case.

An object of the present invention is to provide a new and novel battery terminal clamp which may be quickly and easily attached to a cable end without employing solder or specialized tools.

Another object is the provision of a battery terminal clamp wherein the bared cable ends are concealed from view and moisture is prevented from contacting the bared cable end.

A further object is to provide a battery terminal clamp to which a cable end may be connected from opposite directions.

Yet another object is the provision of a battery terminal clamp which is simple and inexpensive in construction, yet sturdy and reliable in operation.

Other objects and many of the attendant advantages of the present invention will become more apparent when considered in connection with the following specification and accompanying drawing wherein:

Fig. 1 is a top view of the invention device connected to a cable end and mounted upon a battery terminal, Fig. 2 is a sectional view taken along line 2—2 of Fig. 1 looking in the direction of the arrows, Fig. 3 is an enlarged cutaway view of the device showing the internal details thereof, and Fig. 4 is a view of a portion of the device shown in Fig. 3.

Referring now to the drawing wherein like reference characters designate corresponding parts throughout the several views, there is shown in Fig. 1 a battery 10 having a conventional upstanding terminal 11. The invention device comprises a body means indicated generally by the reference numeral 12 having a resilient clamping portion 13 having spaced outer jaws 14 and 15 through which is threaded a bolt 16 having a nut 17 threaded on the outer end thereof. An opening 18 is defined by the inner surface of resilient clamping means 13, and opening 18 has a longitudinal axis 19. It is apparent that clamping portion 13 may be securely clamped upon the terminal of a battery by advancing nut 17 along bolt 16 to move outer jaws 14 and 15 toward one another.

Formed integral with resilient clamping portion 13 is a substantially cylindrical shaped portion 20 having a cylindrical elongated cavity 21 formed therein as seen most clearly in Figs. 3 and 4. Cavity 21 has a longitudinal axis which is substantially normal to the axis 19 of the opening 18 defined within the resilient clamping portion.

Substantially cylindrical threaded opening 22 is provided through the lower end of portion 20 as seen in Fig. 3, and is in communication with one end of cavity 21, the diameter of opening 22 being less than that of cavity 21. Another substantially cylindrical threaded opening 23 is formed through the opposite end of portion 20 and is in communication with the opposite end of cavity 21, the diameter of opening 23 being substantially equal to that of opening 22 and openings 22 and 23 are substantially in alignment with one another.

A cable indicated generally by reference numeral 25 has an insulation covering 26 thereabout, and the bared end portion 27 of the cable comprising the metallic conducting strands thereof is disposed within cavity 21. The insulated portion 26 of the cable preferably extends substantially all the way through threaded opening 22. An expansion means 30 in the form of an elongated pin is provided with threads on the outer surface thereof adapted to cooperate with the threads of opening 23. Pin 30 has an enlarged head 31 at one end thereof and the opposite end 32 is tapered to a point, the pin being of sufficient length to extend to a point adjacent opening 22.

When it is desired to attach a cable end to a battery terminal with the invention device, the cable end may be attached to the clamp either prior or subsequent to attaching the clamp to the battery terminal, as desired. Assuming that pin 30 is removed from the interior of cavity 21, the bared end of the cable is inserted through opening 22 and into cavity 21, with the insulated covering 26 of the cable extending through opening 22. Expansion means 30 is then threaded through opening 23 and the pointed end 32 of the expansion means will engage the center portion of the bared end of the cable, and as the pin 30 is advanced forward within the cavity, the strands of the bared end of the cable will be wedged apart into tight engagement with the inner surface of the cavity as shown in Fig. 3. As the pointed end of the pin approaches opening 22 and extends partially therethrough, it is apparent that the strands of the cable will be forced outwardly such that the insulated portion of the cable is urged outwardly into sealing engagement with the threads of opening 22, thereby providing an efficient water-proof seal between opening 22 and the insulated covering of the cable. In this manner, entrance of moisture within cavity 21 is prevented since there is a tight seal between the covering of the cable and opening 22, and pin 30 seals the opposite opening 23.

It is apparent that connection of the cable end to the invention device is extremely simple since it is only necessary to insert the bared end of the cable within the cavity and then thread the expansion means into the opposite end of the cavity. It should also be noted that the cable ends may be inserted into either end of the cavity through opening 22 or through opening 23, whichever direction is more suitable in a particular situation. Whichever opening the cable ends are inserted through, the pin 30 will obviously be threaded through the opposite opening.

It is apparent from the foregoing that there is provided a new and novel battery terminal clamp wherein the bared end portions of the cable are concealed and protected from moisture, thereby preventing acidation. The clamp permits the cable to be attached from opposite directions thereto and may be quickly and easily assembled without the necessity of providing solder or other special tools. The device is quite simple and inexpensive in construction, yet is sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A battery terminal clamp comprising a body means including a resilient clamping portion defining an opening adapted to receive a battery terminal, said body means having a substantially cylindrical cavity formed therein, said body means having a first substantially cylindrical threaded opening of smaller diameter than said cavity formed therein and being in communication with one end of said cavity, said body means also having a second substantially cylindrical threaded opening of less diameter than said cavity formed therein and being in communication with the opposite end of said cavity, said first and second openings being of the same size and being substantially aligned with one another to provide a completely reversible arrangement, an elongated expansion means having threads formed on the outer surface thereof, said expansion means being threaded through one of said openings, said expansion means including a substantially cylindrical body portion and including a tapered pointed end portion formed at one end thereof, said expansion means being so proportioned and of such a length that when it is in operative position, part of the cylindrical main body portion thereof is disposed within said cavity and spaced from the cylindrical wall of the cavity so as to jam the bared end portion of a cable received through the other opening and extending within the cavity between the cylindrical body portion of the expansion means and the cylindrical wall of the cavity, and the pointed edge of the expansion means when in operative position extending within the other opening of the body means so as to wedge the insulation of a cable received through the other opening outwardly into the threaded portion of the other opening to provide a water-proof seal between the body means and the cable insulation.

2. A battery terminal clamp comprising a body means including a resilient clamping portion defining an opening adapted to receive a battery terminal, said body means including a substantially cylindrical portion having opposite end walls and defining an elongated substantially cylindrical cavity formed between said end walls, a cylindrical threaded opening formed through each of said end walls, each of said threaded openings having a diameter substantially less than that of the cylindrical cavity, each of said openings being aligned with one another and being of the same diameter so as to provide a completely reversible arrangement, and an expansion means including a main substantially cylindrical body portion having threads formed on the outer surface thereof, said expansion means including a large head formed at one end thereof, and a pointed end portion at the other end thereof which tapers from the cylindrical body portion outwardly to a point, said threaded body portion being threadedly mounted in one of said openings and said enlarged head including a surface engaging the outer surface of one of said end walls and limiting inward movement of the expansion means, the expansion means when in operative position being so dimensioned that the tapered end portion of the expansion means extends a substantial distance within the other of the openings and is spaced from the threads thereof, whereby the bared end portion of a cable received through the other opening and within the cavity is wedged between the cylindrical main body portion of the expansion means and the wall of said cavity, and the insulation of the cable which extends within the other of said openings is forced outwardly by the tapered end portion of the expansion means into the threads of the other opening to provide a water-proof seal between the body means and the cable insulation.

References Cited in the file of this patent

UNITED STATES PATENTS

| 1,650,064 | Dennis | Nov. 22, 1927 |
| 1,699,825 | Waltz | Jan. 22, 1929 |
| 1,834,475 | Sottiaux | Dec. 1, 1931 |
| 2,436,712 | Burrell et al. | Feb. 24, 1948 |
| 2,780,704 | Charbonneau | Feb. 5, 1957 |

FOREIGN PATENTS

| 22,634 | Great Britain | Oct. 20, 1903 |
| 234,217 | Switzerland | Jan. 3, 1945 |